United States Patent [19]
Hertel et al.

[11] Patent Number: 6,036,259
[45] Date of Patent: Mar. 14, 2000

[54] MOTOR VEHICLE ROOF WITH CABLE CONNECTION

[75] Inventors: Johann Hertel, Neuried; Walter Schätzler, Starnberg, both of Germany

[73] Assignee: Webasto Karosseriesysteme GmbH, Stockdorf, Germany

[21] Appl. No.: 08/955,741

[22] Filed: Oct. 22, 1997

[30] Foreign Application Priority Data

Dec. 4, 1996 [DE] Germany .......................... 196 50 227

[51] Int. Cl.[7] ...................................... B60J 7/05
[52] U.S. Cl. .................. 296/216.01; 296/221; 174/117 F
[58] Field of Search ................ 296/211, 216.01–216.03, 296/221; 49/28; 174/72 A, 117 F

[56] References Cited

U.S. PATENT DOCUMENTS

| | | | |
|---|---|---|---|
| 4,812,135 | 3/1989 | Smith | 174/117 F |
| 4,862,011 | 8/1989 | Wright | 174/72 A |
| 5,154,481 | 10/1992 | Paetz et al. | 296/211 |
| 5,212,348 | 5/1993 | Gibson | 174/74 R |
| 5,261,722 | 11/1993 | Staley et al. | 296/211 |
| 5,354,954 | 10/1994 | Peterson | 174/117 F |
| 5,581,944 | 12/1996 | Kornbrekke et al. | 49/28 |

FOREIGN PATENT DOCUMENTS

| | | |
|---|---|---|
| 0 282 389 | 9/1988 | European Pat. Off. . |
| 36 14 880 | 11/1987 | Germany . |
| 38 30 484 | 3/1989 | Germany . |
| 43 40 013 | 6/1995 | Germany . |
| 60-185915 | 9/1985 | Japan .................................. 174/117 F |
| 1-282021 | 11/1989 | Japan . |
| 0 448 807 | 3/1994 | United Kingdom . |

OTHER PUBLICATIONS

Japanese Abstract No. 4–82908, Dec. 1, 1992, Mazda Co., Ltd. and Daikyo–Webasto Co., Ltd., Figs. 1–6, 8 pages.

*Primary Examiner*—Dennis H. Pedder
*Attorney, Agent, or Firm*—Sixbey, Friedman, Leedom & Ferguson; David S. Safran

[57] ABSTRACT

A motor vehicle roof with movable cover element (13) which can close or selectively at least partially expose a roof opening (12) in a fixed roof surface (11). There is an electrical cable connection between the cover element (13) and the fixed roof surface (11). The cable connection is attached at one point to, cover element (13) and at a different point securely to the roof. The electrical connection is formed of a ribbon cable which is bent in a U shape in its longitudinal direction between the attachment points (21, 27) and is essentially planar in its transverse direction between the attachment points (21 and 27). The ribbon cable (20) peals off of the contact surface (23) provided on cover element (13) and/or the roof contact surface (26) when the cover element (13) is moved and is reapplied in an opposite direction of movement.

15 Claims, 2 Drawing Sheets

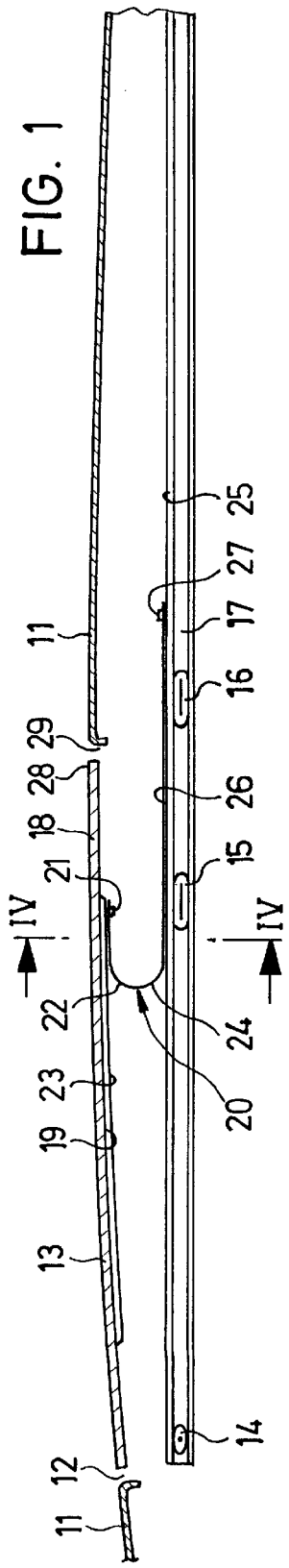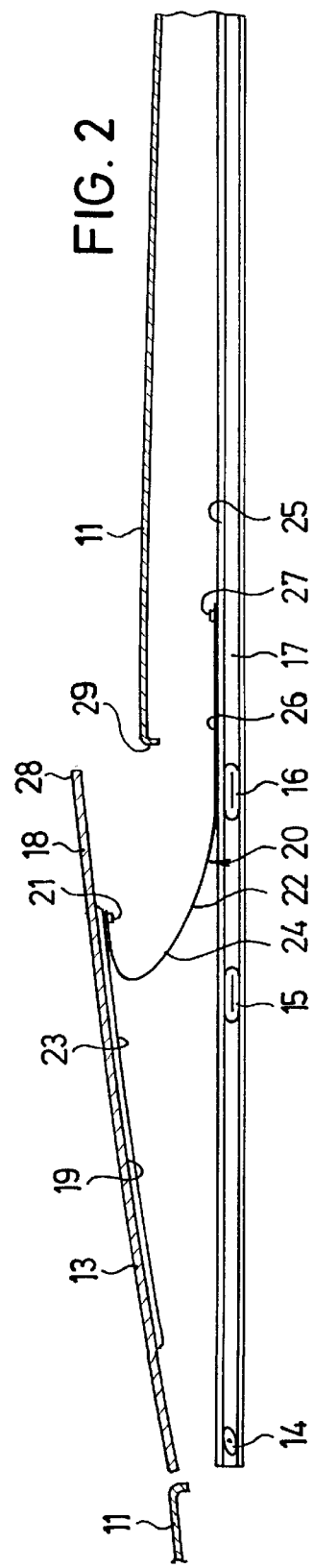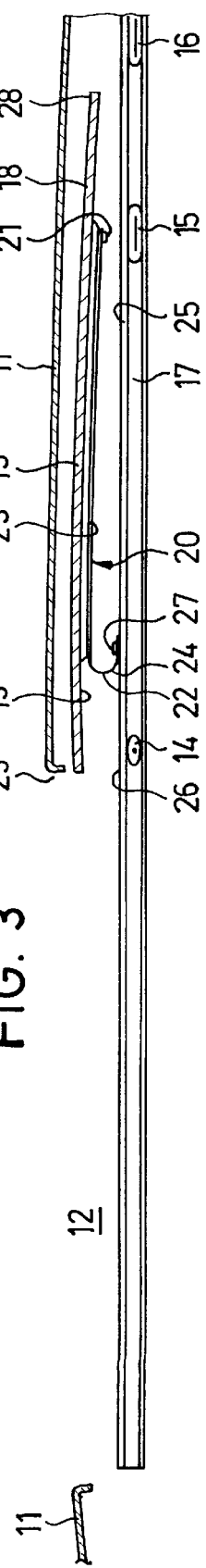

MOTOR VEHICLE ROOF WITH CABLE CONNECTION

BACKGROUND OF THE INVENTION

1. Field of the Invention

The invention relates to a motor vehicle roof with an displaceable cover element which can close or selectively at least partially expose a roof opening made in a fixed roof surface, an electrical cable connection being provided between the cover element and the fixed roof surface and the cable connection being attached at one point to the cover element and being attached elsewhere securely to the roof.

2. Description of Related Art

A motor vehicle roof of the initially mentioned generic type is known, for example, from German Patent Application DE 36 14 880 A1. A power cable with cylindrical cross section is used for this purpose and it is automatically rolled up as necessary between its attachment points onto a cable roller which is pivotally attached on the roof or cover, and which is prestressed with a spring, in order to hold the cable taut between the attachment points.

The disadvantage in this arrangement is that the cable roller involves additional parts expense, requires more installation space, and furthermore, generally does not operate without rattling when the cover part is moved.

Japanese utility model 4-82908 discloses a cable guide on a movable cover in which a cable is attached to arms which are hinged to one another. This design is expensive since it requires additional parts.

Japanese patent application 1-282021 discloses a motor vehicle roof with a cover-mounted brush which has a sliding contact which runs along a roof-mounted contact rail. Sliding contacts are subject to increased wear and are sensitive to dirt. German Patent Application DE 38 30 484 A1 discloses a motor vehicle roof with a cover-mounted transfer contact which is guided in a roof-mounted contact rail and which is prestressed to abut the rail. The disadvantage in this approach is, likewise, the unreliable electrical contact, the susceptibility to dirt, and the wear of mechanical parts.

UK Patent No. 0 448, 807 and U.S. Pat. No. 5,154,481 disclose a contact arrangement between a movable cover provided with a solar generator and a roof frame, electrical contact being established only at points in certain roof positions. The disadvantage here is that there is no electrical connection independently of the roof position.

German Patent Application DE 43 40 013 A1 discloses an electrical window lifter in which a removable part is moved lengthwise on a door-mounted rack by means of an electric motor attached to the part. Power is supplied to the motor by means of a ribbon-like power lead which is located between two attachment points in a loop which hangs freely down and which is made more or less stretched depending on the position of the window. The plane of the power lead is guided parallel to the surface of the window. A loop which hangs freely down may be practical for a door window since it is hidden within the door but is not suitable for a horizontally movable sliding roof cover.

SUMMARY OF THE INVENTION

Therefore, a primary object of this invention is to devise a motor vehicle roof with an electrical connection between a movable cover element and the vehicle which avoids the aforementioned defects of known arrangements and by means of which reliable, low-wear contact can be accomplished at a low structural height.

This object is achieved based on a motor vehicle roof of the initially mentioned type by the electrical connection being made as a ribbon cable which is bent in a U shape in its longitudinal direction between the attachment points and which runs essentially linearly in its transverse direction between the attachment points, and by the ribbon cable unwinding, on the one hand, on a contact surface provided on the cover element, and on the other hand, on a roof-mounted contact surface, when the cover element is displaced.

In this approach, according to the present invention, it is especially advantageous that rattle-free cable guidance for a movable cover element with low structural heights can be accomplished easily and cost-favorably, and that the cable can unwind in a controlled manner and thus can be arranged such that it is not visible when the cover element is opened.

In another advantageous embodiment of the invention, it is provided that the ribbon cable is guided along the contact surface of the cover element and/or the roof-mounted bearing surface in the transverse direction, preferably the ribbon cable being guided by lateral contact with a crosspiece projecting from the contact surface at each side of the cable. This increases the reliability of cable guidance in a simple manner.

In another preferred embodiment, it is provided that the ribbon cable is extrusion-coated with a soft material or consists of a soft carrier material to minimize noise development.

Furthermore, it is preferably provided that ferromagnetic material is worked into the ribbon cable and magnets or magnetic foils are attached to the contact surface of the cover element or the roof contact surface, or that the contact surface of the cover element and/or the roof contact surface contains ferromagnetic material and magnets or a magnetic foil are worked into the ribbon cable.

Alternatively, it can be provided that the ribbon cable, on the side facing the contact surfaces, is at least partially provided with a loop strip and the contact surface of the cover element and/or the roof contact surface is provided at least in part with a hook strip, in which the attachment of the loop strip and the hook strip can be interchanged so that, in any case, a VELCRO® hook-and-loop type connection is formed by the loop and hook strips. These measures improve the contact of the ribbon cable with the contact surfaces.

In addition, one preferred embodiment of the invention makes use of a steel strip worked into the ribbon cable in the manner of a flexible tape measure. This increases cable stiffness, and likewise, improves the contact of the ribbon cable with the contact surfaces.

These and further objects, features and advantages of the present invention will become apparent from the following description when taken in connection with the accompanying drawings which, for purposes of illustration only, show several embodiments in accordance with the present invention.

BRIEF DESCRIPTION OF THE DRAWINGS

FIG. 1 shows a side cross-sectional view of a motor vehicle roof according to the invention in the closed position of the cover;

FIG. 2 shows a view like FIG. 1, but with the cover raised;

FIG. 3 shows a view like FIG. 1, but with the cover pushed back;

DETAILED DESCRIPTION OF THE PREFERRED EMBODIMENTS

Figure 4:
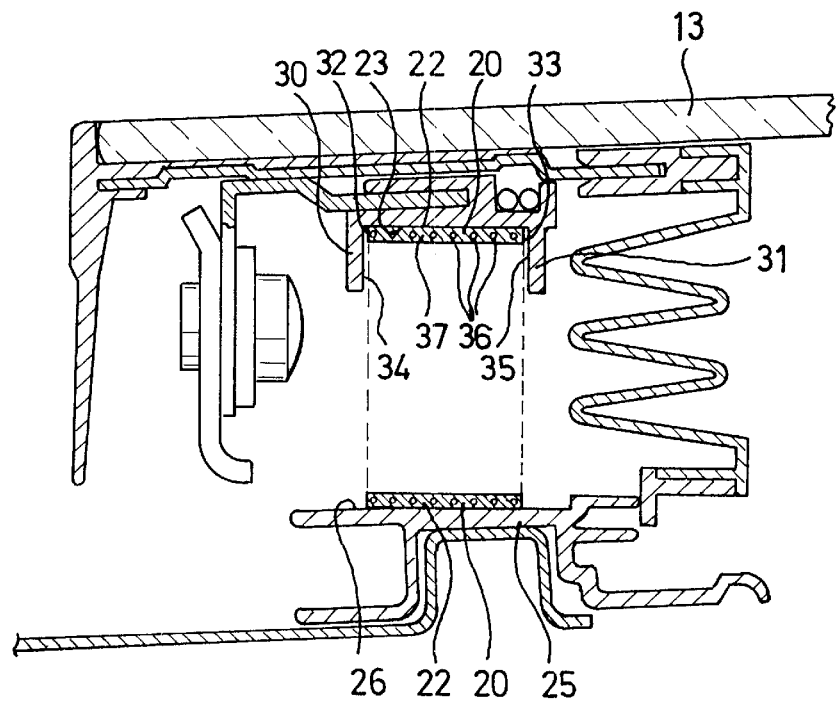
FIG. 4 shows a cross section of the edge area of the roof opening taken along line IV—IV of FIG. 1.

With reference to FIG. 1, a fixed roof surface 11 is provided with a roof opening 12 which is closed by a cover 13. Cover 13 is movably guided in the longitudinal direction of the roof by means of three guide shoes 14, 15, 16 which fit into a guide rail 17 which is attached to a roof-mounted frame 25. Furthermore, a conventional raising mechanism (not shown) is provided, preferably between guide shoes 15 and 16, and which can bring cover 13, which is pivotally connected to the front guide shoe 14, into the raised position shown in FIG. 2. Furthermore, cover 13, proceeding from the closed position shown in FIG. 1, can be brought into a fully opened position, which is shown in FIG. 3, in which cover 13 is pushed back under the fixed roof surface 11 so that it at least partially exposes the roof opening 12. Cover 13 is preferably displaced in the conventional manner by an electric drive via a stiff drive cable. But, there can also be manual drive. However, the specific manner in which the cover is displaced forms no part of this invention, and it is intended for the invention described below to be applied to vehicle roofs which are otherwise conventional in every respect.

In the rear section 18 of cover 13, on cover bottom 19, one end of a flexible, elastic ribbon cable 20 is attached to a site labeled 21. Ribbon cable 20 establishes an electrical connection between the cover 13 and the vehicle body or frame 25. This electrical connection is necessary, for example, to relay a signal of a sensor attached to the cover, for example, of a pressure sensor attached to the front edge of the cover as a pinch protection, or to connect a solar generator attached on cover 13 to the vehicle electronics.

Proceeding from attachment point 21, ribbon cable 20 first runs forward, with its wide side 22 adjoining the contact surface 23 provided on the cover bottom 19. At a distance from attachment site 21, the ribbon cable 20 is bent in a U shape in the manner of a loop in curved area 24 so as to then extend to the rear Following the curved area, ribbon cable 20, with its wide side 22, adjoins a contact surface 26 that is provided on the roof-mounted frame 25. At the end of this area, the ribbon cable 20 is attached to roof-mounted frame 25 at a point labelled 27. Ribbon cable 20 is aligned such that it runs essentially planarly in its transverse direction between attachment points 21 and 27, i.e., ribbon cable 20 is not twisted between attachment points 25 and 27, it being aligned essentially parallel to the plane of fixed roof surface 11 with respect to its transverse direction. Frame attachment point 27 is rearward of cover attachment point 21 when the cover is closed (FIG. 1).

In the raised position of cover 13 shown in FIG. 2, the rear edge 28 of the cover is lifted above the rear edge 29 of the roof opening 12, by which attachment point 21 has been displaced with respect to attachment point 27. Ribbon cable 20 thus reacts such that curved area 24 is enlarged at the cost of the sections of ribbon cable 20 which adjoin the contact surfaces 23, 26, the radius of curvature of curved area 24 increasing.

In the open position shown in FIG. 3, cover 13 is pushed back under the fixed roof surface 11. In this position, the cover attachment point 21 is behind frame attachment point 27. The radius of curvature of curved area 24 is similar to that in the closed position in FIG. 1. The section of ribbon cable 20 which adjoins cover contact surface 23 in the open position takes most of the length of ribbon cable 20 between attachment points 21 and 27, while the part of the ribbon cable adjoining the frame-contact surface 26 is at its minimum length.

FIG. 4 shows a partial cross section through the edge area of the roof in the closed position of FIG. 1. From cover contact surface 23, two essentially vertical crosspieces project downwardly, ribbon cable 20 being guided between these two crosspieces 30, 31 in the transverse direction by lateral contact, i.e., contact of side edges 32 or 33 of ribbon cable 20 on insides 34 or 35 of crosspiece 30 or 31. As shown, each of the contact surfaces 30, 32 can be formed by the base of a channel-shaped part, free legs of which constitute the crosspieces 30, 31 which form the lateral guides for transversely guiding the ribbon cable.

Ribbon cable 20 is comprised of several power leads 36 and an insulating carrier 37. The material of carrier 37 and the width of ribbon cable 20 are preferably chosen such that the bending stiffness of ribbon cable 20 is high enough to prevent drooping of ribbon cable 20 between attachment points 21 and 27. In this case, additional safeguard measures can be abandoned. The lateral guidance by means of crosspieces 30, 31 is likewise optional, if ribbon cable 20 in a special configuration, i.e., for a given arrangement of attachment points 21 and 27, has sufficient resistance to lateral deflection, i.e., deflection in the transverse direction. In practice, good results can be achieved with a commercial ribbon cable with a PVC carrier material and a width of roughly 13 mm.

The stiffness of ribbon cable 20 can, optionally, be increased by incorporating a strip of a different material, for example, a resilient steel strip, as is known of flexible tapes measures.

Figure 5:
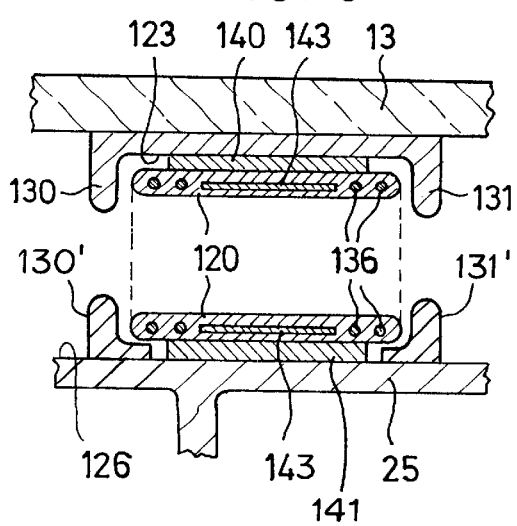
FIG. 5 is a view similar to FIG. 4, but of a different embodiment of the invention.

FIG. 5 shows one alternative embodiment of a ribbon cable and the corresponding contact surfaces. The cover contact surface 123 and the frame contact surface 126 are each provided with a permanent magnetic foil 140, 141 over at least a part thereof. Furthermore, the cover contact surface 123 is provided with lateral guides for the ribbon cable 120 in the form of two crosspieces 130, 131, and lateral guides 130', 131' can be provided the frame contact surface 126. A steel strip 143 is worked into ribbon cable 120 in its middle area 142, and as a result of its magnetic property, is attracted by the permanent magnetic foil 140, 141, and thus, the strip is brought into detachable contact with a respective one of the contact surfaces 123, 126.

Furthermore, steel strip 143 is used to increase the stiffness of ribbon cable 120. The magnetic foil 140, 141 necessarily extends over practically the entire width of ribbon cable 120. There are several power leads 136 in each side edge area of ribbon cable 120.

Conversely, the contact surfaces can be provided with magnetic material or can consist entirely of it, while the ribbon cable contains permanent magnetic material. Furthermore it is also possible that magnetic retaining forces are not necessary on the two contact surfaces so that only one contact surface is magnetizable or contains permanent magnetic material.

Figure 6:
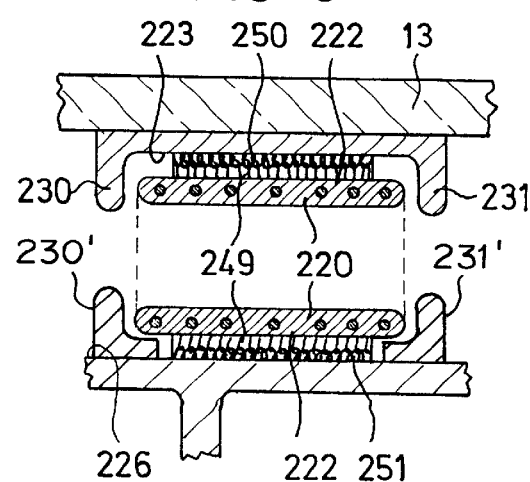
FIG. 6 is a view like FIG. 5, but of a third embodiment of the invention.

FIG. 6 shows another alternative embodiment of a ribbon cable and the corresponding contact surfaces. Ribbon cable 220 is provided on its top 222 with a hook strip 249, while cover contact surface 223 and frame contact surface 226 are each provided with a loop strip 250 or 251. Loop strips 250, 251 and hook strip 249 when adjoining one another form an easily detachable VELCRO® hook and loop type connection, by which ribbon cable 220 is detachably held on contact surface 223 or 226. The cover-mounted contact surface 223 is provided with a lateral guide for ribbon cable 220 in the form of two crosspieces 230, 231, and lateral guides 230', 231' can be provided for the frame contact surface 226.

Alternatively, the ribbon cable can be provided with a loop strip and the contact surfaces with a hook strip. It can also be enough for the adhesive action to occur only on one of the contact surfaces so that only one contact surface is provided with a loop strip or hook strip.

To reduce or hinder noise development, the ribbon cable can be extrusion-coated with a soft material, for example, rubber, or can consist of a carrier material.

Although the invention has been described so far with reference to a sliding/lifting roof, it can also be used in all other roof types with at least one adjustable cover or cover part. In particular the invention is not limited to motor vehicle roofs with a single movable cover element, but can also be used in louvered roofs, folding roofs and roofs with several separate covers.

Contact between the cover and fixed motor vehicle roof can also be used for energy transmission, for example, from solar cells to a fan and/or the motor vehicle battery, or for signal transmission, for example, from an antipinch sensor to a roof control device.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

We claim:

1. Motor vehicle roof comprising:
    a fixed roof surface having a roof opening therein;
    a movable cover element which is displaceable between a position closing the roof opening and a position at least partially exposing the roof opening;
    an electrical cable connection provided between the movable cover element and the fixed roof surface, the cable connection being attached at one point to the cover element and being attached at different point securely to the roof;
    wherein the electrical connection is made of a ribbon cable in which conductive leads and a separate, flat resilient steel stiffening strip is embedded and which is bent in a U shape in its longitudinal direction between said attachment points and which is essentially planar in its transverse direction at least between said attachment points; wherein a cover contact surface along which a portion of the ribbon cable runs is provided on the cover element, the ribbon cable peeling off of the cover contact surface in at least one direction of movement of the cover element and being reapplied, with the assistance of said resilient stiffening strip, in an opposite direction of movement of the cover; and wherein a roof contact surface is provided on a fixed part of the roof along which the ribbon cable runs, the ribbon cable peeling off of the roof contact surface in at least one direction of movement of the cover element and being reapplied, with the assistance of said resilient strip, in an opposite direction of movement.

2. Motor vehicle roof as claimed in claim 1, wherein a lateral guide for the ribbon cable is provided along at least one of said contact surfaces for guiding the ribbon cable in a transverse direction.

3. Motor vehicle roof as claimed in claim 2, wherein the lateral guide comprises a crosspiece projecting from said at least one of the contact surfaces at each side of the ribbon cable for guiding the ribbon cable by lateral contact therewith.

4. Motor vehicle roof as claimed in claim 1, wherein the ribbon cable comprises a soft carrier material.

5. Motor vehicle roof comprising:
    a fixed roof surface having a roof opening therein;
    a movable cover element which is displaceable between a position closing the roof opening and a position at least partially exposing the roof opening;
    an electrical cable connection provided between the movable cover element and the fixed roof surface, the cable connection being attached at one point to the cover element and being attached at different point securely to the roof;
    wherein the electrical connection is made of a ribbon cable which is bent in a U shape in its longitudinal direction between said attachment points and which is essentially planar in its transverse direction at least between said attachment points; wherein a cover contact surface along which a portion of the ribbon cable runs is provided on the cover element, the ribbon cable peeling off of the cover contact surface in at least one direction of movement of the cover element and being reapplied in an opposite direction of movement of the cover; and wherein a roof contact surface is provided on a fixed part of the roof along which the ribbon cable runs, the ribbon cable peeling off of the roof contact surface in at least one direction of movement of the cover element and being reapplied in an opposite direction of movement; and wherein a ferromagnetic material is embedded in the ribbon cable and a magnetic material is attached to at least one of the cover contact surface and the roof contact surface.

6. Motor vehicle roof comprising:
    a fixed roof surface having a roof opening therein;
    a movable cover element which is displaceable between a position closing the roof opening and a position at least partially exposing the roof opening;
    an electrical cable connection provided between the movable cover element and the fixed roof surface, the cable connection being attached at one point to the cover element and being attached at different point securely to the roof;
    wherein the electrical connection is made of a ribbon cable which is bent in a U shape in its longitudinal direction between said attachment points and which is essentially planar in its transverse direction at least between said attachment points; wherein a cover contact surface along which a portion of the ribbon cable runs is provided on the cover element, the ribbon cable peeling off of the cover contact surface in at least one direction of movement of the cover element and being reapplied in an opposite direction of movement of the cover; and wherein a roof contact surface is provided on a fixed part of the roof along which the ribbon cable runs, the ribbon cable peeling off of the roof contact surface in at least one direction of movement of the cover element and being reapplied in an opposite direction of movement; and wherein a magnetic material is embedded in the ribbon cable and a ferromagnetic material is attached to at least one of the cover contact surface and the roof contact surface.

7. Motor vehicle roof comprising:

a fixed roof surface having a roof opening therein;

a movable cover element which is displaceable between a position closing the roof opening and a position at least partially exposing the roof opening;

an electrical cable connection provided between the movable cover element and the fixed roof surface, the cable connection being attached at one point to the cover element and being attached at different point securely to the roof;

wherein the electrical connection is made of a ribbon cable which is bent in a U shape in its longitudinal direction between said attachment points and which is essentially planar in its transverse direction at least between said attachment points; wherein a cover contact surface along which a portion of the ribbon cable runs is provided on the cover element, the ribbon cable peeling off of the cover contact surface in at least one direction of movement of the cover element and being reapplied in an opposite direction of movement of the cover; and wherein a roof contact surface is provided on a fixed part of the roof along which the ribbon cable runs, the ribbon cable peeling off of the roof contact surface in at least one direction of movement of the cover element and being reapplied in an opposite direction of movement; and wherein the ribbon cable is at least partially provided with one of a hook strip and a loop strip of a hook-and-loop connector, and wherein at least one of the cover contact surface and the roof contact surface is provided at least in part with the other of the loop strip and hook strip of the hook-and-loop connector.

8. Motor vehicle roof as claimed in claim 7, wherein both the cover contact surface and the roof contact surface are provided at least in part with the other of the loop strip and hook strip of the hook-and-loop connector.

9. Motor vehicle roof as claimed in claim 1, wherein a lateral guide for the ribbon cable is provided along both of said contact surfaces for guiding the ribbon cable in a transverse direction.

10. Motor vehicle roof as claimed in claim 9, wherein the lateral guide comprises a crosspiece projecting from the contact surfaces at each side of the ribbon cable for guiding the ribbon cable by lateral contact therewith.

11. Motor vehicle roof as claimed in claim 1, wherein the movable cover element is pivotally displaceable into an upwardly inclined, raised position, the ribbon cable pealing off of both of said contact surfaces during movement of the cover element from the closed position into said raised position.

12. Motor vehicle roof as claimed in claim 11, wherein the movable cover element is slidable displaceable into an rearwardly retracted position, the ribbon cable pealing off of said roof contact surface and being applied to said cover contact surface during movement of the cover element from the closed position into said retracted position.

13. Motor vehicle roof as claimed in claim 1, wherein the movable cover element is slidable displaceable into an rearwardly retracted position, the ribbon cable pealing off of said roof contact surface and being applied to said cover contact surface during movement of the cover element from the closed position into said retracted position.

14. Motor vehicle roof as claimed in claim 1, wherein the roof contact surface is mounted on a frame which is secured to the fixed roof surface.

15. Motor vehicle roof as claimed in claim 1, wherein at least one of the contact surfaces is formed by a base of a channel-shaped part, free legs of which form lateral guides for guiding the ribbon cable in a transverse direction.

* * * * *